US009779282B1

(12) United States Patent
Ghavanini (10) Patent No.: US 9,779,282 B1
(45) Date of Patent: Oct. 3, 2017

(54) CAPACITIVE FINGERPRINT SENSING DEVICE AND METHOD FOR CAPTURING A FINGERPRINT USING THE SENSING DEVICE

(71) Applicant: Fingerprint Cards AB, Göteborg (SE)

(72) Inventor: Farzan Ghavanini, Göteborg (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 15/397,038

(22) Filed: Jan. 3, 2017

(30) Foreign Application Priority Data

Mar. 14, 2016 (SE) ...................................... 1650342

(51) Int. Cl.
*G06K 9/00* (2006.01)
*G06K 7/00* (2006.01)
*G05B 19/00* (2006.01)

(52) U.S. Cl.
CPC ....... *G06K 9/00087* (2013.01); *G06K 9/0002* (2013.01); *G06K 9/00899* (2013.01)

(58) Field of Classification Search
CPC ............. G06K 9/00087; G06K 9/0002; G06K 9/00899; G06K 9/00026; G06K 9/00013; G06K 9/00067
USPC ......... 382/100, 115, 116, 124, 312; 340/5.8, 340/5.81, 5.82, 5.83, 5.52, 5.53; 310/311, 310/314, 316.01, 334, 328, 321, 322;
(Continued)

(56) References Cited

U.S. PATENT DOCUMENTS 6,996,883 B2 * 2/2006 Chandran ............. B06B 1/0611
216/13
7,322,093 B2 * 1/2008 Kadota ..................... H03H 3/04
29/25.35
(Continued)

FOREIGN PATENT DOCUMENTS

DE        101 25 593        1/2002
WO     WO 2014/018121     1/2014
(Continued)

OTHER PUBLICATIONS

Search Report from Swedish Application No. SE-1650592-7, dated Dec. 22, 2016.
(Continued)

*Primary Examiner* — Sheela C Chawan
(74) *Attorney, Agent, or Firm* — Westman, Champlin & Koehler, P.A.

(57) ABSTRACT

The present invention relates to a capacitive fingerprint sensing device for sensing a fingerprint pattern. The sensing device comprises a protective dielectric top layer having an outer surface forming a sensing surface to be touched by the finger; a two-dimensional array of electrically conductive sensing structures arranged underneath the top layer; readout circuitry coupled to each of the electrically conductive sensing structures to receive a sensing signal indicative of a distance between the finger and the sensing structure; and an electroacoustic transducer arranged underneath the top layer and configured to generate an acoustic wave, and to transmit the acoustic wave through the protective dielectric top layer towards the sensing surface to induce an ultrasonic vibration potential in a ridge of finger placed in contact with the sensing surface.

20 Claims, 8 Drawing Sheets

(58) Field of Classification Search
USPC .......... 73/570, 584, 596, 632, 633; 367/140, 367/141, 151; 29/25.35
See application file for complete search history.

(56) References Cited

U.S. PATENT DOCUMENTS

| | | | |
|---|---|---|---|
| 8,331,633 B2* | 12/2012 | Schmitt ................ | G06K 9/0002 382/124 |
| 8,873,341 B2* | 10/2014 | Lebental ................ | B06B 1/0292 367/181 |
| 9,465,051 B1* | 10/2016 | Schneider .............. | G01R 15/16 |
| 2009/0021487 A1 | 1/2009 | Tien | |
| 2014/0354596 A1 | 12/2014 | Djordjev et al. | |
| 2015/0169136 A1 | 6/2015 | Ganti et al. | |
| 2015/0241393 A1* | 8/2015 | Ganti ..................... | G01N 29/09 73/589 |
| 2015/0358740 A1* | 12/2015 | Tsai ....................... | G01N 29/36 73/632 |
| 2016/0092715 A1 | 3/2016 | Yazdandoost et al. | |
| 2016/0117034 A1 | 4/2016 | Day | |

FOREIGN PATENT DOCUMENTS

| | | |
|---|---|---|
| WO | WO 2015/009635 | 1/2015 |
| WO | WO 2016/032652 | 3/2016 |

OTHER PUBLICATIONS

Office Action from U.S. Appl. No. 15/409,803, dated Jun. 13, 2017.

\* cited by examiner

CAPACITIVE FINGERPRINT SENSING DEVICE AND METHOD FOR CAPTURING A FINGERPRINT USING THE SENSING DEVICE

CROSS-REFERENCE TO RELATED APPLICATION

The present application is based on and claims the benefit of Swedish patent application Ser. No. 1650342-7, filed Mar. 14, 2016, the content of which is hereby incorporated by reference in its entirety.

FIELD OF THE INVENTION

The present invention relates to a fingerprint sensing device. In particular, the present invention relates to a capacitive fingerprint sensing device comprising an electroacoustic transducer, and to a method for capturing a fingerprint using the sensing device.

BACKGROUND OF THE INVENTION

Various types of biometric systems are used more and more in order to provide for increased security and/or enhanced user convenience. In particular, fingerprint sensing systems have been adopted in, for example, consumer electronic devices, thanks to their small form factor, high performance, and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

Since a capacitive sensor detects a finger based on the capacitance between the finger and the sensor, the distance between the sensing surface and the sensing structures directly influence the contrast and the resolution of the fingerprint image captured by the measurement. This traditionally did not pose a problem as the thickness of the cover material could be chosen with little design pressure. However, according to new design trends it is desirable to place the sensor under thick cover glass and to eventually integrate the fingerprint sensor within a display arrangement.

This presents a challenging problem. The source of this problem is not only related to weakening of the capacitive signal by increased finger-to-sensor distance. Commercially available capacitive touch sensors may function well through thick cover glasses. However, a problem is related to the loss of resolution and image contrast as the finger-to-sensor distance is increased. This is caused by the fact that distinguishing minute capacitance variations due to finger corrugations from a large background "average" that comes from the sum of all the ridges and valleys "visible" to a pixel becomes extremely difficult at large finger-to-sensor distances.

Accordingly, it is desirable to provide a fingerprint sensor overcoming some of the above described difficulties associated with capacitive sensing through thick cover layers.

SUMMARY

In view of above-mentioned and other drawbacks of the prior art, it is an object of the present invention to provide an improved fingerprint sensing device for capacitive fingerprint measurement.

According to a first aspect of the invention, there is provided a capacitive fingerprint sensing device for sensing a fingerprint pattern of a finger, the capacitive fingerprint sensing device comprising: a protective dielectric top layer having an outer surface forming a sensing surface to be touched by the finger; a two-dimensional array of electrically conductive sensing structures arranged underneath the top layer; readout circuitry coupled to each of the electrically conductive sensing structures to receive a sensing signal indicative of a distance between the finger and the sensing structure; and an electroacoustic transducer arranged underneath the top layer and configured to generate an acoustic wave, and to transmit the acoustic wave through the protective dielectric top layer towards the sensing surface to induce an ultrasonic vibration potential in a ridge of finger placed in contact with the sensing surface.

In the present context, the protective dielectric top layer may be a single layer or it may comprise a plurality of stacked layers. Moreover, that the layer is dielectric in the present context means that it is non-conductive, and that it can be representative of a dielectric in a parallel plate capacitor where the two plates are represented by a finger placed on the outer surface of the sensing device and each of the electrically conductive sensing structures. Accordingly, that the two-dimensional array of electrically conductive sensing structures is arranged underneath the top layer does not exclude the possibility that there may be additional layers arranged between the sensing structures and the outer surface of the sensing device. Moreover, that the electroacoustic transducer is arranged underneath the top layer is in the present context interpreted to mean that the electroacoustic transducer is arranged below, or beneath, the top layer as seen from an outer sensing surface of the sensing device. Thereby, additional layers may be arranged between the electroacoustic transducer and the top layer, as will be described in the following.

An electroacoustic transducer converts an electric signal to an acoustic signal to provide an acoustic wave having a frequency which is typically in the ultrasound range, i.e. a frequency above the audible range. When a finger is placed on the surface of the fingerprint sensing device, the ridges of the fingers are in contact with the surface while the valleys of the finger are not. The portion of the acoustic wave reaching an interface between the top layer and the ridge of the finger will penetrate into the finger, whereas the portion of the acoustic wave reaching an interface between the top layer and air will be reflected due to the large difference in acoustic impedance between the top layer and air. Next, the portion of the acoustic wave penetrating the finger gives rise to an induced ultrasonic vibration potential, which can be detected by the capacitive fingerprint sensing device. The mechanisms behind the generation of the ultrasonic vibration potential in the finger will be discussed in further detail in the detailed description section.

Accordingly, the present invention is based on the realization that capacitive fingerprint sensing can be improved by providing a fingerprint sensing device capable of inducing an ultrasonic vibration potential in the finger by means of an electroacoustic transducer, thereby creating an electric potential which is detected by the sensing structures. Thereby, an improved capacitive coupling between ridges of the finger and the sensing structures is achieved, and the influence from the valleys in the capacitive measurement, i.e. the background influence, is reduced. This is in contrast with existing technologies where a potential is controllably introduced into the finger through a galvanic or capacitive coupling to the finger, hence the entire finger is placed at the same potential level, i.e. both ridges and valleys. In comparison, the above described sensing device only induces a potential in the ridges of the finger, thereby providing a larger contrast between ridges and valleys, which in turn improves the contrast of the capacitive measurement.

The above described inventive concept is also applicable as an enhancement to existing capacitive fingerprint sensing technologies where non-acoustic means for potential generation in the finger are already used. Furthermore, the present invention opens up new opportunities relating to the sensing device architecture since these non-acoustic means for introducing a potential in the finger may be eliminated.

According to one embodiment of the invention, the electroacoustic transducer may be an ultrasonic transmitter configured to generate an ultrasonic wave. Ultrasonic transmitters are a commonly used type of electroacoustic transducers which convert an electric signal into an ultrasonic wave, and the properties of ultrasonic transmitters are well known, facilitating integration in a fingerprint sensing device.

Moreover, the electroacoustic transducer may advantageously be a planar electroacoustic transducer, providing the advantage that it is easily integrated in a planar sensor structure.

In one embodiment of the invention, the electroacoustic transducer may be configured such that the transmitted acoustic wave is a plane wave. By providing the acoustic wave as a plane wave, all the parts of the finger in contact with the surface of the sensing device, i.e. all the finger ridges in contact with the surface of the sensing device, are simultaneously excited by the penetrating acoustic wave and hence exhibit an ultrasonic vibrational potential. Consequently, an image of the entire fingerprint can be taken at once by simultaneously measuring the capacitive coupling of all sensing structures. Moreover, a plane wave provides a uniformity of the magnitude of the induced ultrasonic vibration potential in the finger over the entire sensor area, which in turn simplifies the capacitive measurement since it can be assumed that the influence from the ultrasonic vibration potential is the same for all parts of the finger in contact with the sensor.

In one embodiment of the invention the top layer may be configured to have an acoustic impedance matching an acoustic impedance of a finger. The portion of the acoustic wave transitioning over the interface between the top layer and the finger is determined by the difference in their acoustic impedances, where a large difference in acoustic impedance results in that a large portion of the acoustic wave is reflected, whereas a small difference means that the wave travels across the interface. Accordingly, it is desirable to select the top layer from a material having an acoustic impedance which is as similar as possible to the acoustic impedance of the finger. The difference in acoustic impedance between air and a solid material is typically several orders of magnitude. However, even though many solid materials would provide a large contrast in acoustic impedance compared to air, it is still desirable to select a material having an acoustic impedance which is as similar as possible to that of a finger to avoid or reduce reflection losses at the interface.

According to one embodiment of the invention, the transducer may be a piezoelectric transducer, such as Piezoelectric Micromachined Ultrasonic Transducer, PMUT. The piezoelectric transducer may include piezoelectric crystals, piezoelectric ceramics, or piezoelectric polymer. Moreover, the electroacoustic transducer may also be a Capacitive Micromachined Ultrasonic Transducer, CMUT.

According to one embodiment of the invention the electroacoustic transducer may be of the same size as the array of sensing structures, meaning that the transducer has the same surface area as the overall surface area array of sensing structures. Thereby, the transducer can transmit an acoustic wave which induces an ultrasonic vibration potential in the finger over the entire active surface of the fingerprint sensing device.

According to one embodiment of the invention, the fingerprint sensing device may comprise a plurality of electroacoustic transducers, where each electroacoustic transducer has an area corresponding to an area of a sub-array of the array of sensing structures. A sub-array of the array of sensing structures can for example be a regular n×m array, where n and m can be selected based on the desired number of electroacoustic transducers. Moreover, the plurality of electroacoustic transducers may be individually controllable such that it can be selected which transducers are active at any given time. This may be advantageous for example if a finger is placed only on a portion of the area of the fingerprint sensing device, or if there are specific regions where the contrast needs to be enhanced. Accordingly, the plurality of electroacoustic transducers offers an increased flexibility in acquiring a fingerprint image. The total area of the plurality of electroacoustic transducers may correspond to the total area of the array of the sensing structures, or the plurality of electroacoustic transducers may be arranged to only cover selected portions of the sensing device area. Furthermore, in a fingerprint sensing device comprising a plurality of electroacoustic transducers, it can be selected which transducers are used at a specific measurement, which in turn leads to reduced energy consumption compared to a sensing device comprising one transducer covering the entire sensing area.

According to one embodiment of the invention, the array of sensing structures may be arranged between the transducer and the protective dielectric top layer. Thereby, there is no increase in the distance between the sensing array and the finger as compared to a conventional capacitive fingerprint sensing device. Moreover, by forming a stack of layers where the electroacoustic transducer is located at the bottom, beneath the sensing structures, a capacitive fingerprint sensing device can be manufactured according to known methods, without having to modify the manufacturing process to accommodate for the electroacoustic transducer. The electroacoustic transducer may thus be readily integrated in existing manufacturing schemes. Furthermore, since the acoustic wave as such does not disturb or influence the capacitive sensing, the acoustic wave can pass through the sensing structures and associated circuitry without adverse effects, or with only negligible adverse effects.

According to one embodiment of the invention, the sensing device may further comprise a delay layer arranged between the electroacoustic transducer and the array of sensing structures. The delay layer increases the time it takes for the generated acoustic wave to reach the finger. The delay layer is advantageously placed between the electroacoustic transducer and the array of sensing structures, i.e. below the array of sensing structures. The delay layer may for example comprise a plastic material or PMMA. Effects and advantages related to the delay layer will be discussed in further detail below in relation to a method for controlling the fingerprint sensing device.

According to one embodiment of the invention, the sensing device may further comprise a shielding layer arranged between the electroacoustic transducer and the array of sensing structures to electrically shield the array of sensing structures from the electroacoustic transducer. Even though there is no or limited electromagnetic distortion from the acoustic wave as such, the electroacoustic transducer may generate an electromagnetic field during generation of the acoustic wave, in turn influencing the sensing structures during capacitive sensing. Accordingly, a shielding layer can reduce or eliminate the influence of the electromagnetic field on the sensing structures.

According to one embodiment of the invention, the shielding layer may comprise an electrically conductive structure connected to ground potential, thereby electromagnetically shielding the sensing structures from the electroacoustic transducer. The electrically conductive structure can be a continuous layer, individual structures, a grid, an array of structures etc.

According to one embodiment of the invention, the electroacoustic transducer may be arranged between the array of sensing structures and the protective top layer. Since the electroacoustic transducer can be made from a non-conductive material, such as a piezoelectric material it is possible to place the electroacoustic transducer between the array of sensing structures and the protective top layer as long as there are no conductive structures of the transducer shielding the sensing structures from the finger.

According to a second aspect of the invention, there is provided a method for controlling a capacitive fingerprint sensing device comprising: a protective dielectric top layer having an outer surface forming a sensing surface to be touched by the finger; a two-dimensional array of electrically conductive sensing structures arranged underneath the top layer; readout circuitry coupled to each of the electrically conductive sensing structures to receive a sensing signal indicative of a distance between the finger and the sensing structure; and an electroacoustic transducer arranged underneath the top layer, the method comprising: activating the electroacoustic transducer, generating an acoustic wave, and transmitting the acoustic wave through the protective dielectric top layer towards the sensing surface to induce an ultrasonic vibration potential in a ridge of a finger placed in contact with the sensing surface; and capturing a main fingerprint image by reading out a capacitive coupling between the finger and each of the sensing structures by means of the readout circuitry.

The above described method outlines the capture of a fingerprint using a capacitive fingerprint sensing device comprising an electroacoustic transducer generating an acoustic wave to induce an ultrasonic vibration potential in the ridges of the finger placed in contact with the sensing surface. In a sensing device where no additional potential reference is connected to the finger, the described method can be seen as an enhanced direct capacitive measurement method.

According to one embodiment of the invention, the method may further comprise, before the step of activating the electroacoustic transducer, capturing an initial fingerprint image; comparing the initial fingerprint image with the main fingerprint image; and if the difference between the initial and the main fingerprint image is larger than a predetermined threshold, determining that the fingerprint image originates from an authentic finger. By capturing an initial fingerprint image before the activation of the electroacoustic transducer, a reference image is acquired where the finger is not influenced by an acoustic wave, and where no ultrasonic vibration potential is present in the finger. Due to the mechanisms responsible for inducing an ultrasonic vibration potential, it is required that the substance placed on the fingerprint sensor is an ionic or colloidal substance, such as a finger. Thereby, an inorganic material, such as rubber or a plastic material, placed on the finger would not give rise to an ultrasonic vibration potential when the electroacoustic transducer is active. Accordingly, for a fake fingerprint made from rubber or the like, there would not be any detectable difference between the images captured before and after the electroacoustic transducer is activated. Thereby, a fake fingerprint can be detected to prevent fingerprint spoofing.

Accordingly, when the reference image is compared to the main image captured when the electroacoustic transducer is active and when an ultrasonic vibration potential is induced in the fingerprint ridges, a difference between the two images can be seen as a difference in contrast between ridges and valleys of the finger. Thus, the predetermined threshold can for example be a predetermined average difference in contrast between ridges and valley of the fingerprint.

If a difference between the initial image and the main image is larger than the predetermined threshold, e.g. if there is a noticeable difference in contrast, it can be determined that the fingerprint image originates from an authentic finger.

According to one embodiment of the invention, the method may further comprise, before the step of activating the electroacoustic transducer, capturing an initial fingerprint image; comparing the initial fingerprint image with the main fingerprint image; and if the difference between the initial and the main fingerprint image is smaller than a predetermined threshold, determining that the fingerprint image originates from a fake finger. Analogously to what is described above, if the difference between the initial image and the main image is lower than a predetermined threshold, it can be determined that the fingerprint image originates from a fake finger. The skilled person realizes that the threshold can be defined in many different ways, and that the threshold also may be determined empirically for different types of sensing devices and for different applications.

Accordingly, in addition to the improved contrast between ridges and valleys of the fingerprint, the described sensing device and method also provides efficient spoofing protection/liveness detection.

Additional effects and features of the second aspect of the invention are largely analogous to those described above in connection with the first aspect of the invention.

According to a third aspect of the invention, there is provided a method for controlling a capacitive fingerprint sensing device comprising: a protective dielectric top layer having an outer surface forming a sensing surface to be touched by the finger; a two-dimensional array of electrically conductive sensing structures arranged underneath the top layer; readout circuitry coupled to each of the electrically conductive sensing structures to receive a sensing signal indicative of a distance between the finger and the sensing structure; and an electroacoustic transducer arranged underneath the top layer, the method comprising: activating the electroacoustic transducer, generating an acoustic wave, and transmitting the acoustic wave through the protective dielectric top layer towards the sensing surface to induce an ultrasonic vibration potential in a ridge of a finger placed in contact with the sensing surface; deactivating the electroacoustic transducer; and while the ultrasonic vibration potential in the finger is detectable, capturing a fingerprint image by reading out a capacitive coupling between the finger and each of the sensing structures by means of the readout circuitry.

By means of the above described method, a fingerprint image can be captured when the induced ultrasonic vibration potential in the finger is detectable, but when the electroacoustic transducer is deactivated, thereby eliminating the risk that an electromagnetic field from the transducer's activity disturbs the capacitive measurement.

The principle of the method is based on the difference in propagation velocity between the acoustic wave and the electromagnetic field. Accordingly, in a simplified description, the acoustic wave is generated and transmitted by the transducer, after which the transducer is deactivated. When the transducer is deactivated, the electromagnetic field from the transducer can be considered to go to zero instantaneously. In the meantime, the acoustic wave can be seen as still propagating towards the finger. When the acoustic wave penetrates the finger, an ultrasonic vibration potential is induced and a fingerprint image can be captured by means of the readout circuitry. The timing of the capacitive measurement must be controlled such that the time between deactivation of the transducer and the image capture is sufficiently short so that the influence of the ultrasonic vibration potential in the finger is still detectable.

The described method may advantageously be employed in a fingerprint sensing device comprising a delay layer as described above. The delay layer creates a time margin within which the acoustic wave is still penetrating the finger while the transducer is deactivated, hence eliminating the adverse effects of the electromagnetic field generated by the transducer on the capacitive sensing structures. The delay layer can be arranged and configured in many different ways as long as the generated acoustic wave passes through the delay layer on its way to the finger.

Additional effects and features of the third aspect of the invention are largely analogous to those described above in connection with the first and second aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a capacitive fingerprint sensing device suitable for being arranged in an electronic device such as a mobile phone. It should however be noted that various embodiments of the fingerprint sensing device may be adapted for use also in other applications.

Figure 1:
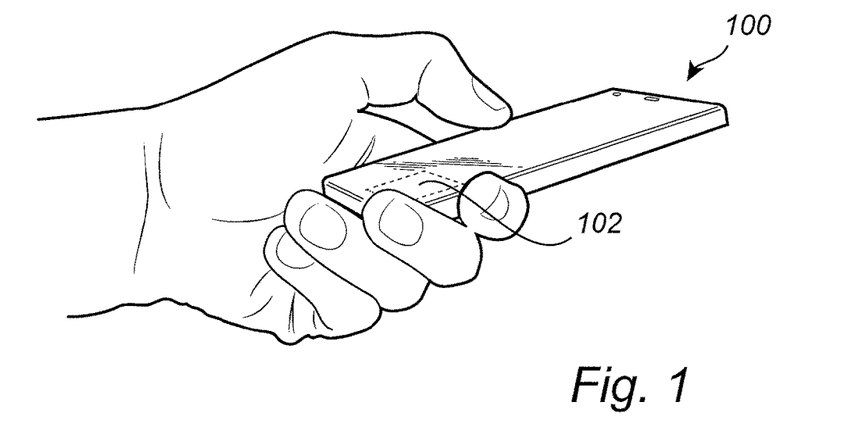
FIG. 1 schematically illustrates a mobile phone comprising a fingerprint sensing device.

FIG. 1 schematically illustrates an application for a fingerprint sensing device 102 according to an example embodiment of the present invention, in the form of a mobile phone 100 with an integrated fingerprint sensing device 102. The fingerprint sensing device is illustrated here as being arranged underneath a cover glass of the mobile phone 100. The fingerprint sensing device 102 may also be arranged in a button, on the side or on a backside of a phone.

The fingerprint sensing device 102 may, for example, be used for unlocking the mobile phone 100 and/or for authorizing transactions carried out using the mobile phone, etc. A fingerprint sensing device 102 according to various embodiments of the invention may also be used in other devices, such as tablet computers, laptops, smart cards or other types of consumer electronics.

Figure 2:
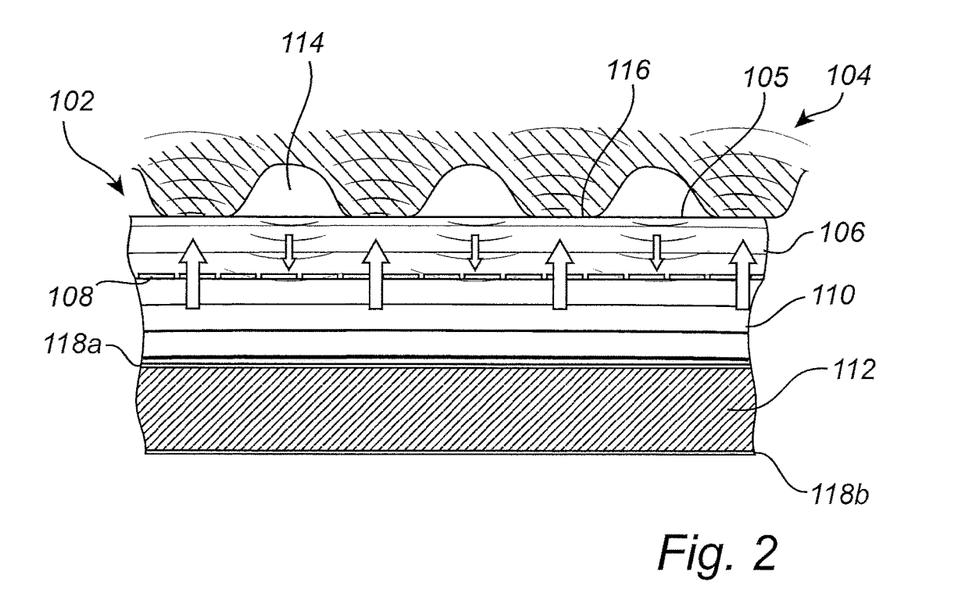
FIG. 2 schematically illustrates a fingerprint sensing device according to an embodiment of the invention.

FIG. 2 is a schematic cross section of a portion of the fingerprint sensing device 102 according to an embodiment of the invention, with a finger 104 placed on an outer surface of the sensing device 102. The fingerprint sensing device 102 comprises a protective dielectric top layer 106 having an outer surface forming a sensing surface 105 to be touched by a finger. A two-dimensional array of electrically conductive sensing structures 108 is arranged underneath the top layer 106, and readout circuitry is coupled to each of the electrically conductive sensing structures 108 to receive a sensing signal indicative of a distance between the finger and the sensing structure 108. The array of sensing structures 108 is here illustrated as being arranged on a substrate 110, where the substrate may include at least a portion of the readout circuitry. The substrate 110 may for example be a silicon substrate and the fingerprint sensing device 102 may be manufactured using conventional silicon-compatible manufacturing techniques.

Furthermore, the sensing device 102 comprises an electroacoustic transducer 112 arranged underneath the top layer 106. In FIG. 2, the electroacoustic transducer 112 is arranged underneath the substrate 110. The electroacoustic transducer 112 is configured to generate an acoustic wave, and to transmit the acoustic wave through the protective dielectric top layer 106 towards the sensing surface 105 to induce an ultrasonic vibration potential in a ridge 116 of finger 104 placed in contact with the sensing surface 105. In the illustrated embodiment, the acoustic wave passes through the substrate 110 before it reaches the protective dielectric top layer 106. It should be noted that even though the substrate 110 and the top layer 106 are illustrated as single layers, both may comprise a plurality of layers, i.e. consist of a stack of layers, as will be discussed in further detail in relation to various embodiments of the invention.

The electroacoustic transducer 112 may be a plane wave generator. FIG. 2 shows an electroacoustic transducer 112 comprising a sheet of piezoelectric material sandwiched between a first metallic electrode layer 118a and a second metallic electrode layer 118b. The piezoelectric sheet may be made of piezoelectric ceramics, piezoelectric crystals, or piezoelectric polymers. The metallic electrodes 118a-b can be deposited or attached on either sides of the piezoelectric sheet in a number of different ways known to a person skilled in the art. By applying an electrical signal to the electrodes 118a-b of the plane wave generator 112 as described above, an acoustic wave is generated that emanates in a planar fashion, i.e. the acoustic energy is distributed uniformly over the wavefront.

The electroacoustic transducer 112 may be a piezoelectric transducer based on, a Piezoelectric Micromachined Ultrasonic Transducer, PMUT, or a Capacitive Micromachined Ultrasonic Transducer, CMUT. The electroacoustic transducer 112 can in some cases also be referred to as an ultrasonic transmitter. As an example, the frequency of the acoustic wave is in the range of 10 MHz to 100 MHz.

The present fingerprint sensing device 102 is utilizing an induced ultrasonic vibration potential in the finger. The mechanisms that lead to the generation of the ultrasonic vibration potential in a body are described in the following.

It has long been known that the propagation of longitudinal ultrasonic waves through an electrolytic solution result in the generation of alternating potential differences within the solution. These alternating potentials were first predicted for simple ionic solutions. In the presence of a longitudinal sound wave, any differences in the effective mass or friction coefficient between anions and cations would result in different displacement amplitudes. In turn, this difference in displacement would create an alternating electric potential between points within the solution. This phenomenon is sometimes referred to as an "Ion Vibration Potential" and is a type of ultrasonic vibration potential.

Figure 3A:
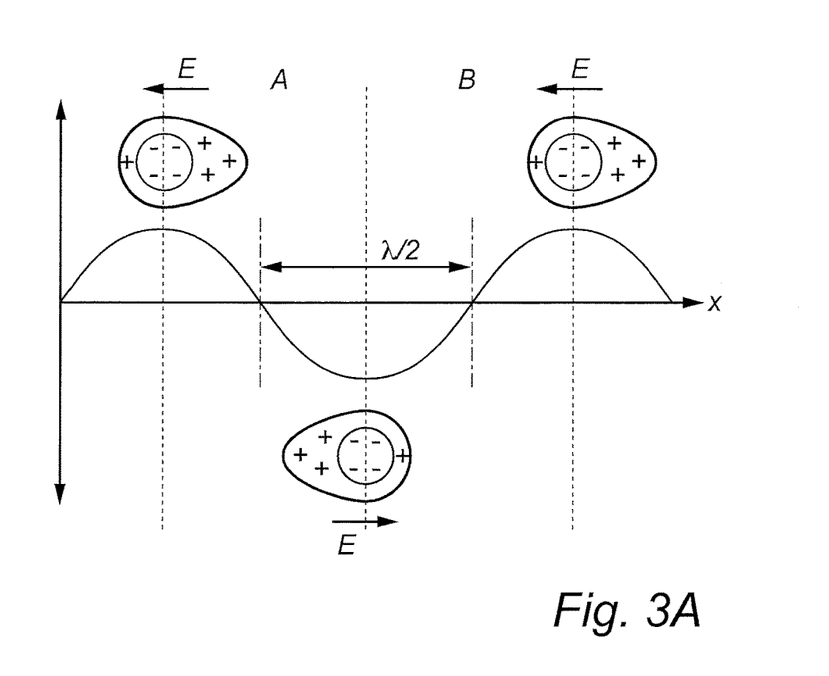
FIGS. 3A-D schematically illustrate the displacement of charge carriers resulting from an acoustic wave.

The mechanism of the generation of an ion vibration potential is schematically shown in FIG. 3A illustrating displacements at a particular instant represented on the Y-axis and distance in the direction of propagation on the X-axis. For the conditions represented here region A will be charged positively relative to region B. For example, if inert metal probes are placed at positions A and B, an alternating potential difference will be observed since the curve representing displacement may be considered as traveling in the positive direction at the speed of sound in a progressive sound field. The frequency of the alternating potentials corresponds to that of the sound field.

It has been shown that an ion vibration potential is generated in every instance where ultrasonic waves are propagated through a solution containing ionic species, however complex these species may be, as for instance proteins or poly-ions in solutions of polyelectrolytes.

Figure 3B:
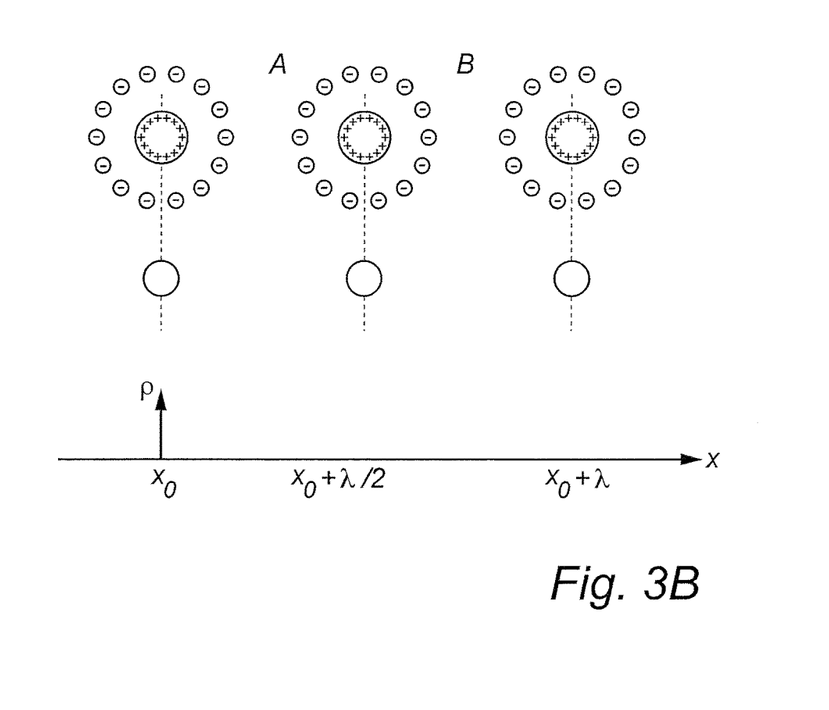

Ultrasonic vibration potential has also been shown to arise in colloidal suspensions. Colloids are suspensions of charged particles in a liquid with a counter charge distributed in the fluid around each particle as illustrated in FIG. 3B. The counter charge, which is normally a spherical distribution around the particles, gives the solution overall charge neutrality and stabilizes the suspension against particle agglomeration. When sound propagates through a suspension where the particles have either a higher or a lower density than that of the surrounding fluid, the amplitude and phase of the particle motion, owing to the difference in inertia between the particle and the volume of fluid it displaces, differs from that of the fluid so that fluid flows back and forth relative to the particle on alternating phases of the acoustic cycle. Since the counter charge is carried by the fluid, the oscillatory motion of the fluid relative to the particle distorts the normally spherical counter charge distribution creating an oscillating dipole at the site of each particle which results in a macroscopic voltage. This type of ultrasonic vibration potential is referred to as "Colloid vibration potential". The generation of a colloid vibration potential is schematically shown in FIGS. 3C-D.

Figure 3C:
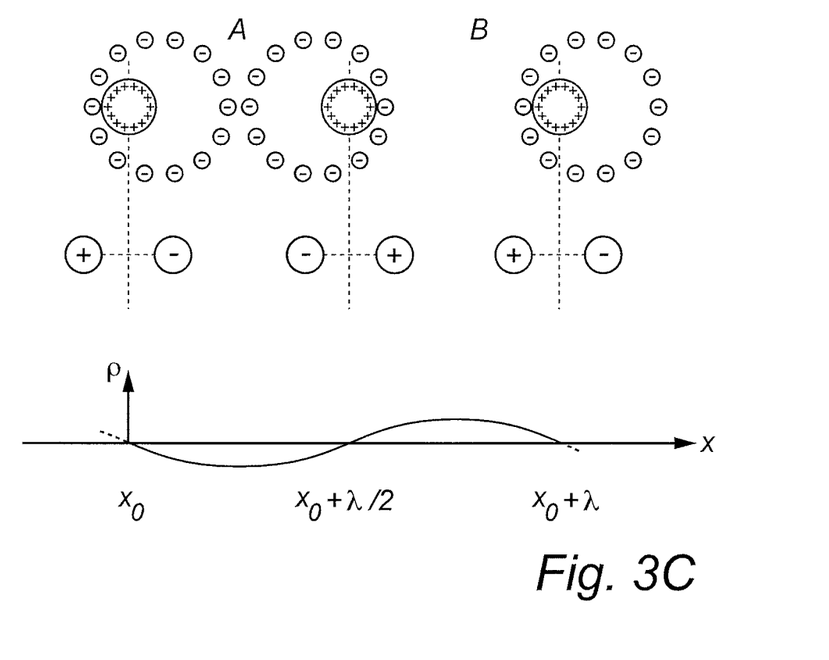

FIG. 3C illustrates colloidal particles and countercharge in the presence of an acoustic wave, where two dipoles oscillate out of phase to each other. At the point in time illustrated in FIG. 3C, region A will be negatively charged relative to region B.

Figure 3D:
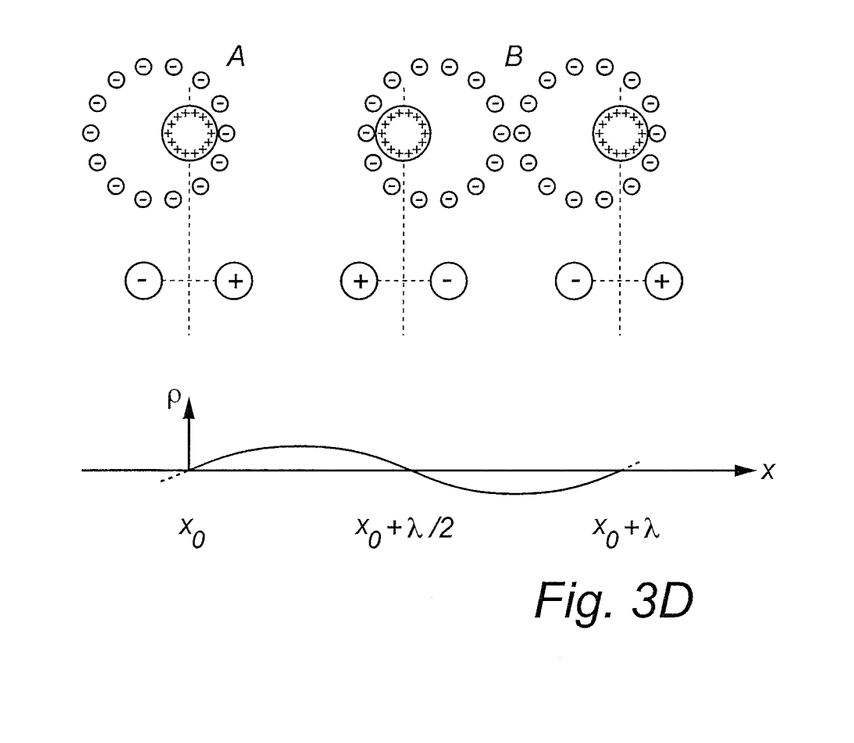

FIG. 3D illustrate the following half period of the acoustic wave, where the dipoles have moved to the opposite phase, making region A positively charged relative to region B. It can thus be understood that a periodic ultrasonic vibration potential is formed, having the same frequency as the frequency of the acoustic wave.

The human body is a relatively good conductor of electricity. This is due to the electrolytic nature of the fluids in the human body. For example, sodium chloride in water is decomposed to positively charged sodium ions and negatively charged chlorine. The ionic nature of the liquids in the body makes it possible to create a vibration potential by exposing the body to ultrasonic waves.

Moreover, the strongest ultrasonic vibration potential signals that have been detected so far in biological samples are from blood. This is due to the fact that blood is both colloidal, as a result of the presence of red blood cells, and ionic, from dissolved electrolytes, leading to the generation of larger vibration potentials. This can be exploited to develop a more secure fingerprint sensor where the presence of organic tissue and blood can be used to induce an ultrasonic vibration potential in the finger.

As illustrated in FIG. 2, a longitudinal acoustic wave is generated by the ultrasonic transducer 112. The generated wave travels toward the finger. When the acoustic wave arrives at the interface between the top layer 106 and the finger 104 two possible scenarios may occur. If the interface is made to a fingerprint valley 114 then most of the energy of the arriving acoustic wave will be reflected because of the large mismatch between the acoustic impedance of air and the top layer 106. On the other hand, most of the arriving acoustic energy will penetrate into the finger 104 at the portions of the interface where finger ridges 116 are in direct contact with the top layer 106.

The passage of the ultrasonic wave through the finger tissue at the ridges 116 will generate a periodic potential inside the tissue, i.e. an ultrasonic vibration potential. This in turn causes a periodic electrical field to appear between the fingerprint ridge 116 and the sensing structure 108 placed beneath the ridge 116, which is held at a fixed potential level. This time-varying electric field is then sensed by the sensing structure 108 and registered by the readout circuitry, schematically illustrated in FIG. 4.

Figure 4:
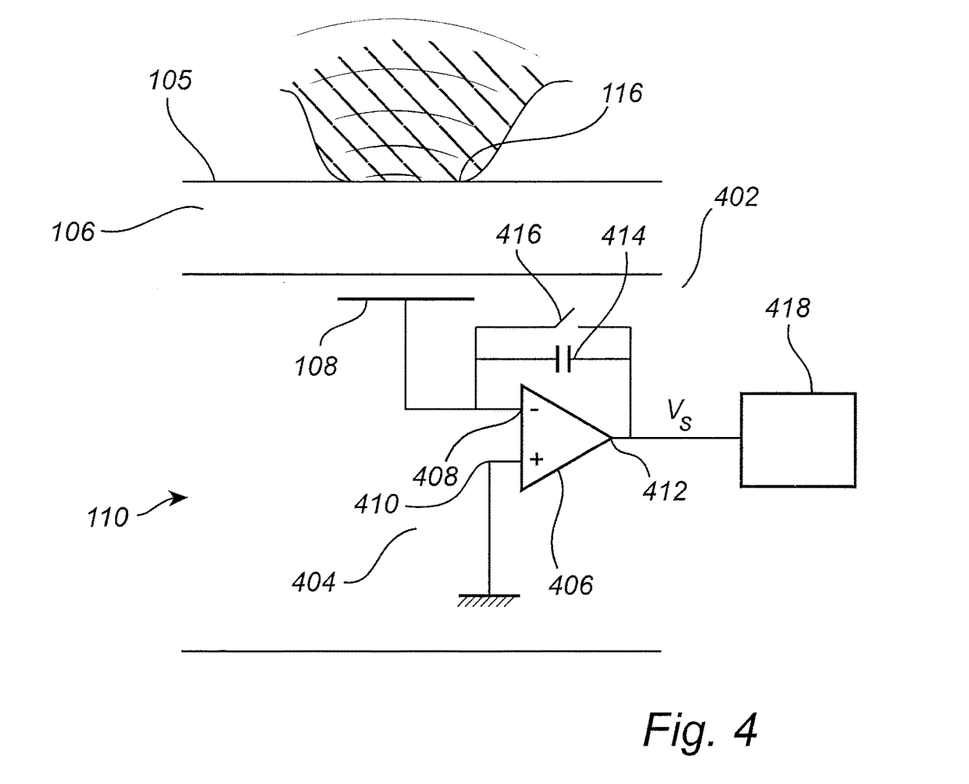
FIG. 4 is a schematic illustration of a portion of the readout circuitry in a fingerprint sensing device according to an embodiment of the invention.

FIG. 4 is a schematic cross section and a circuit schematic of a portion of a fingerprint sensing device 102 according to an embodiment of the invention, with a fingerprint ridge 116 located above a sensing structure 108. The fingerprint sensing device comprises a plurality of sensing elements 402, each comprising a protective dielectric top layer 106, a conductive sensing structure 108, here in the form of a metal plate 108 underneath the protective dielectric top layer 106, a charge amplifier 404. As illustrated in FIG. 4, a ridge 116 of the finger 104 is located directly above the sensing structure 108 indicating the minimum distance between the finger 104 and the sensing structure 108, defined by the dielectric top layer 106.

The charge amplifier 404 comprises at least one amplifier stage, here schematically illustrated as an operational amplifier (op amp) 406 having a first input (negative input) 408 connected to the sensing structure 108, a second input (positive input) 410 connected to ground (or to another reference potential), and an output 412. In addition, the charge amplifier 404 comprises a feedback capacitor 414 connected between the first input 408 and the output 412, and reset circuitry, here functionally illustrated as a switch 416, for allowing controllable discharge of the feedback capacitor 414. The charge amplifier 404 may be reset by operating the reset circuitry 416 to discharge the feedback capacitor 414.

As is often the case for an op amp 406 in a negative feedback configuration, the voltage at the first input 408 follows the voltage at the second input 410. Depending on the particular amplifier configuration, the potential at the first input 408 may be substantially the same as the potential at the second input 410, or there may be a substantially fixed offset between the potential at the first input 408 and the potential at the second input 410. In the configuration of FIG. 4, the first input 408 of the charge amplifier is virtually grounded.

When a finger is placed on the sensing surface, a potential difference occurs between the sensing structure 108 and the fingerprint ridge 116. The induced change in potential difference between the fingerprint ridge 116 and the reference sensing structure 108 in turn results in a sensing voltage signal Vs on the output 412 of the charge amplifier 404, where the amplitude of the voltage is a function of the capacitive coupling between the fingerprint ridge 116 and the sensing structure, and thereby indicative of the existence of an induced vibration potential. The sensing voltage signal $V_S$ is in turn provided to readout circuitry 418 where sensing voltage signals from the array of sensing elements together form a fingerprint image.

As described above in reference to FIG. 2, the electroacoustic transducer 112 generates an acoustic wave, which is transmitted through the protective dielectric top layer 106 towards the sensing surface to induce an ultrasonic vibration potential in a ridge 116 of finger, thereby creating an acoustic field in the finger. The acoustic field gives rise to an ultrasonic vibration potential in the ridge of the finger placed in contact with the sensing surface according to the mechanisms described above. Thereby, the induced ultrasonic vibration potential is detectable by the charge amplifier 404 and a fingerprint image may be captured also in a situation where solely the difference in capacitive coupling of finger ridges and valleys to the sensing structures is not sufficient for the generation of an accurate fingerprint image. This may be the case for thick top layers, such as a cover glass or display glass. Accordingly, the electroacoustic transducer takes no part in the readout of the sensing signal.

In FIG. 4, the charge amplifier 404 and the readout circuitry is illustrated as being located primarily in the substrate 110. However, the charge amplifier and selected portions of the readout circuitry may also be located underneath the electroacoustic transducer, where electrical connections such as via connections can be used to connect the charge amplifiers to the sensing structures.

Figure 5:
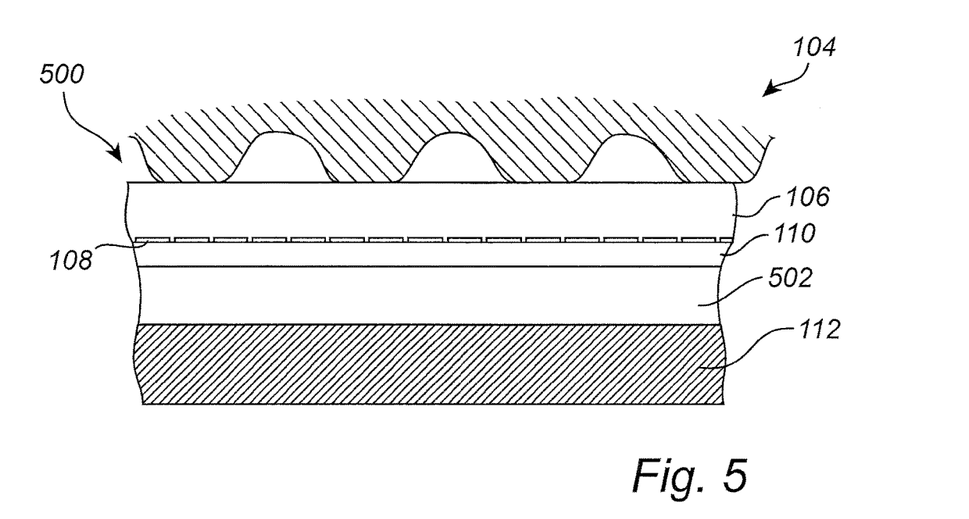
FIG. 5 schematically illustrates a fingerprint sensing device according to an embodiment of the invention.

FIG. 5 is a schematic illustration of an example embodiment of a fingerprint sensing device 500, where a delay layer 502 is arranged between the electroacoustic transducer 112 and the array of sensing structures 108. The purpose of the delay layer 502 is to increase the time it takes for the generated acoustic wave to reach the finger 104, and consequently to increase the time between the generation of an acoustic wave to the generation of an acoustic vibration potential in the finger. It is desirable that the delay layer 502 has low acoustic attenuation to reduce the losses in energy of the acoustic wave as it travels through the delay layer 502. It is also preferable that the acoustic impedance of the delay layer 502 is similar to the acoustic impedance of the adjacent layer, here the substrate 110, to reduce reflections at the interface between the delay layer 502 and the substrate 110.

The delay layer 502 can comprise a plastic material, PMMA or a dielectric material having known acoustic properties. For example, the delay layer may be selected such that at least 10% of the incident energy passes through the delay layer, preferably 50%, and more preferably 90%. The advantages of the delay layer will be discussed further below in relation to a method for controlling a fingerprint sensing device.

Figure 6:
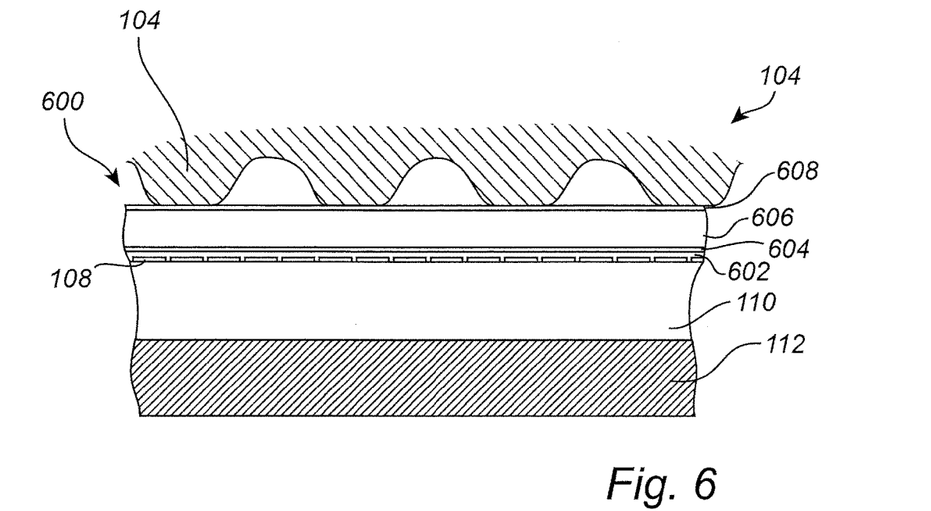
FIG. 6 schematically illustrates a fingerprint sensing device according to an embodiment of the invention.

FIG. 6 is a schematic illustration of an example embodiment of a fingerprint sensing device 600. In the fingerprint sensing device of FIG. 6, the stack of layers arranged over the array of sensing structures 108 comprises an encapsulation layer 602, or a cap layer, arranged to protect the sensing structures, and adhesive layer 604 for attaching a protective plate 606 such as a cover glass to the sensing device, and an outermost layer 608 which may be a colored or patterned coating layer providing a desired aesthetic appearance of the fingerprint sensor 600. Accordingly, all of the aforementioned layers together comprise the dielectric top layer 106. The skilled person realizes that the described stack of layers may be varied in many different ways to form embodiments not explicitly described herein. Moreover, the layers described herein are typically continuous and substantially homogeneous uniform layers.

The outermost layer 608 may also be a matching layer, configured to match the acoustic impedance of the underlying layer, here the protective plate 606, to the acoustic impedance of the finger 104. The acoustic impedance of the matching layer may advantageously be the geometric average of the acoustic impedance of the finger and the acoustic impedance of the underlying layer. By matching the acoustic impedances, the portion of the acoustic wave which is reflected at the interface between the outermost layer and the finger can be minimized, there by maximizing the induced ultrasonic vibration potential.

Figure 7A:
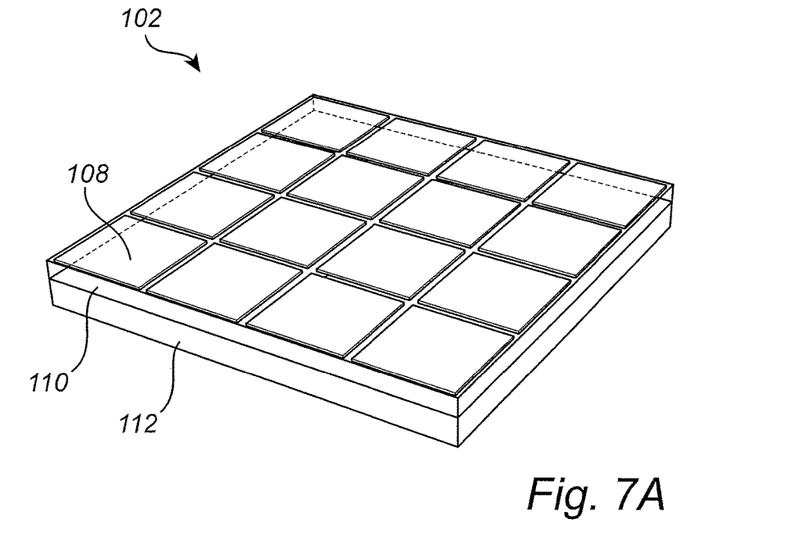
FIGS. 7A-B are schematic illustrations of sensing devices according to embodiments of the invention.
Figure 7B:
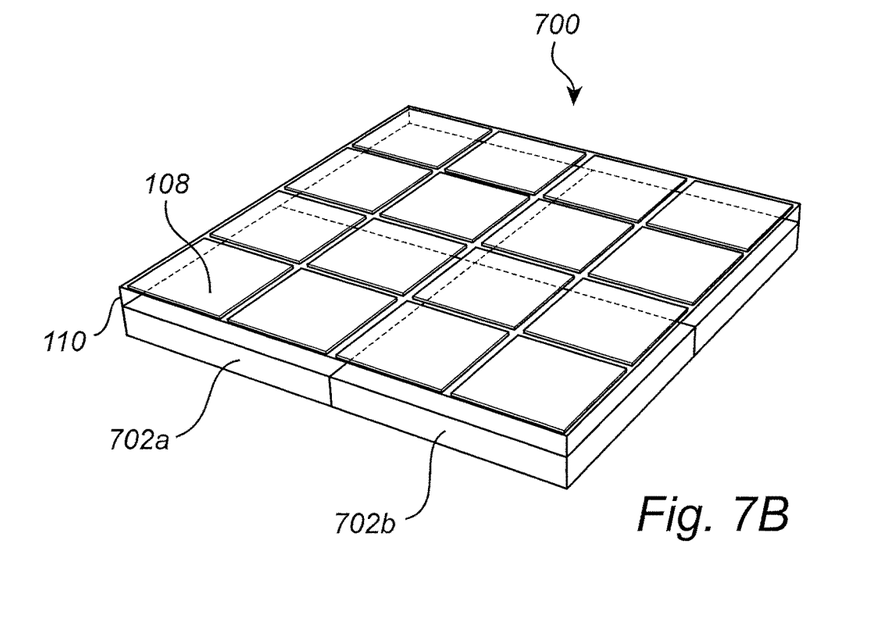

FIG. 7A is a schematic illustration of a sensing device 102 comprising a single electroacoustic transducer 112 of the same size as the array of sensing structures 108. In comparison, FIG. 7B is a schematic illustration of a sensing device 700 comprising a plurality of electroacoustic transducers 702*a-b*, where each electroacoustic transducer 702*a-b* has an area corresponding to a subarea of the array of sensing structures 108. Each electroacoustic transducer can thus be controlled individually such that only selected transducers are activated. For clarity, the sensing devices in FIGS. 7A-B are illustrated without a top layer.

Figure 8A:
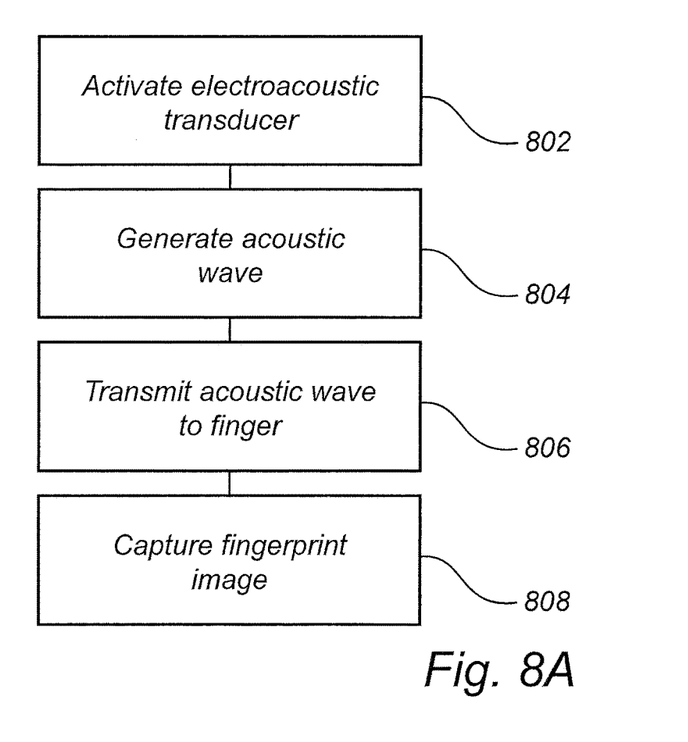
FIGS. 8A-C are flow charts outlining the general steps of methods according to embodiments of the invention.

FIG. 8A is a flow chart outlining the general steps of a method for controlling a fingerprint sensing device according to embodiments of the invention. In a fingerprint sensing device according to any of the above described embodiments, the electroacoustic transducer is activated 802, by providing a supply voltage which is converted such that an acoustic wave is generated 804. Next the acoustic wave is transmitted 806 to the finger such that an ultrasonic vibration potential is induced in the finger. Once the ultrasonic vibration potential is induced, a fingerprint image is captured 808 by reading out the capacitive coupling between the finger and the sensing structures of the sensing array.

Since the ultrasonic vibration potential is a periodic potential, having a frequency corresponding to the frequency of the acoustic wave, it is preferable to capture the fingerprint image when the potential is at or near its maximum amplitude in the regions of the finger closest to the sensing surface.

Figure 8B:
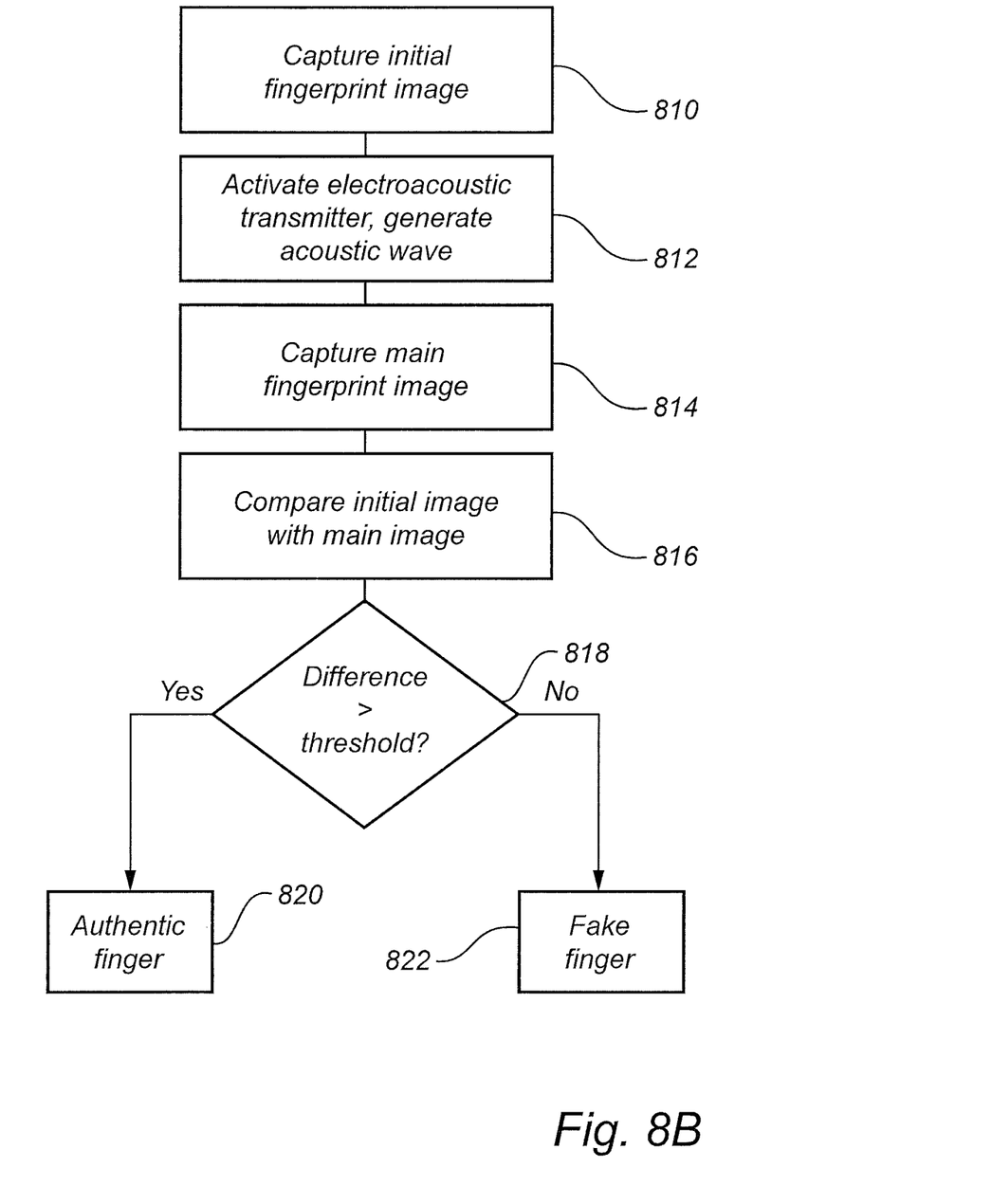

FIG. 8B is a flow chart outlining the general steps of a method for controlling a fingerprint sensing device according to embodiments of the invention. First, with the electroacoustic transducer deactivated, an initial fingerprint image is captured 810. Next 812, the electroacoustic transducer is activated, an acoustic wave is generated, transmitted into the finger, and a second, main, fingerprint image is captured 814. The initial image is compared 816 to the main image, and if the difference is larger than a predetermined threshold 818, it is determined 820 that the captured fingerprint originates from an authentic finger. If the difference between the initial image and the main image is lower than a predetermined threshold, it is determined 822 that the captured fingerprint originates from a fake finger. It should also be noted that the above described method could be combined with other means for liveness detection for even further spoofing protection.

Figure 8C:
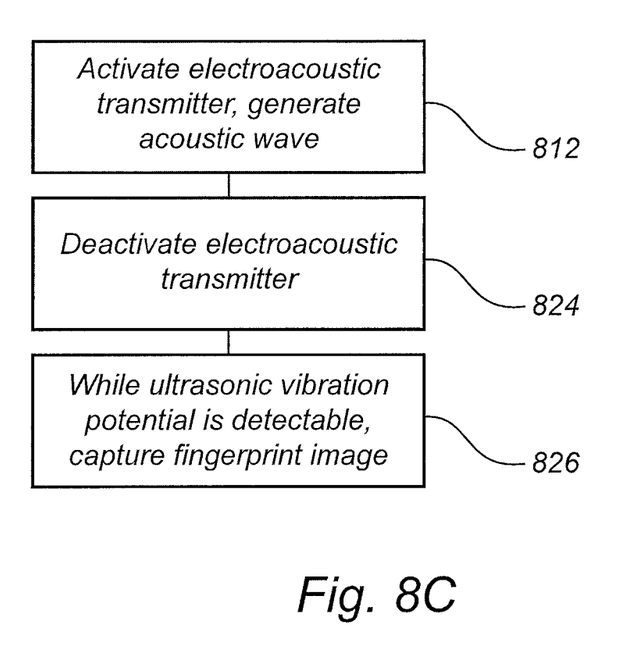

FIG. 8C is a flow chart outlining the general steps of a method for controlling a fingerprint sensing device according to embodiments of the invention. In a first step 812, the electroacoustic transducer is activated, an acoustic wave is generated and transmitted into the finger. Next the electroacoustic transducer is deactivated 824 and while the ultrasonic vibration potential in the finger is detectable, a fingerprint image is captured 826 by reading out a capacitive coupling between the finger and the sensing structures. The described method is advantageously employed in a sensing device 500 comprising a delay layer 502, as illustrated in FIG. 5. By tuning the thickness and acoustic properties of the delay layer, the delay layer can be configured to delay the acoustic wave such that the electroacoustic transducer is deactivated when the fingerprint image is captured, while the ultrasonic vibration potential in the finger is still detectable. Thereby, the distortion from an electromagnetic field generated by the electroacoustic transducer can be avoided. In practice, the fingerprint image is preferably captured as soon as possible after the electroacoustic transducer is deactivated due to the decay of the ultrasonic vibration potential.

The method described in relation to FIG. 8C can also be used in combination with the method illustrated by FIG. 8B. Accordingly, in the method for determining if the fingerprint is authentic or fake, the main fingerprint image can be captured using the method outlined in FIG. 8C, where a fingerprint is captured after the electroacoustic transducer has been deactivated but while there still is a detectable ultrasonic vibration potential in the finger.

Moreover, it should be noted that even though the present invention is described with reference to a capacitive sensing device, the technique described herein utilizing an electroacoustic transducer can be integrated in any type of sensing device capable of directly or indirectly detecting an induced potential in the finger. Such sensing devices include electric field sensing devices and the like.

Even though the invention has been described with reference to specific exemplifying embodiments thereof, many different alterations, modifications and the like will become apparent for those skilled in the art. Also, it should be noted that parts of the fingerprint sensing device and method may be omitted, interchanged or arranged in various ways, the fingerprint sensing device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A capacitive fingerprint sensing device for sensing a fingerprint pattern of a finger, said capacitive fingerprint sensing device comprising:
   a protective dielectric top layer having an outer surface forming a sensing surface to be touched by said finger;
   a two-dimensional array of electrically conductive sensing structures arranged underneath said top layer and configured for use in capturing a fingerprint image based on a capacitive coupling with the finger;
   readout circuitry coupled to each of said electrically conductive sensing structures to receive a sensing signal, based on a capacitive coupling between the finger and a respective sensing structure, indicative of a distance between said finger and said sensing structure; and
   an electroacoustic transducer arranged underneath said top layer and configured to generate an acoustic wave, and to transmit the acoustic wave through the protective dielectric top layer towards the sensing surface to induce an ultrasonic vibration potential in a ridge of finger placed in contact with the sensing surface.

2. The sensing device according to claim 1, wherein the electroacoustic transducer is an ultrasonic transmitter configured to generate an ultrasonic wave.

3. The sensing device according to claim 1, wherein the electroacoustic transducer is a planar electroacoustic transducer.

4. The sensing device according to claim 1, wherein the electroacoustic transducer is configured such that the transmitted acoustic wave is a plane wave.

5. The sensing device according to claim 1, wherein the top layer is configured to have an acoustic impedance matching an acoustic impedance of a finger.

6. The sensing device according to claim 1, wherein the electroacoustic transducer is a piezoelectric transducer.

7. The sensing device according to claim 6, wherein the electroacoustic transducer is a Piezoelectric Micromachined Ultrasonic Transducer, PMUT.

8. The sensing device according to claim 1, wherein the electroacoustic transducer is a Capacitive Micromachined Ultrasonic Transducer, CMUT.

9. The sensing device according to any claim 1, wherein the electroacoustic transducer is of the same size as the array of sensing structures.

10. The sensing device according to claim 1, comprising a plurality of electroacoustic transducers, each electroacoustic transducer having an area corresponding to an area of a sub-array of the array of sensing structures.

11. The sensing device according to claim 1, wherein the array of sensing structures is arranged between the transducer and the protective dielectric top layer.

12. The sensing device according to claim 11, further comprising a delay layer arranged between the electroacoustic transducer and the array of sensing structures.

13. The sensing device according to claim 12, wherein the delay layer comprises a plastic material or PMMA.

14. The sensing device according to claim 1, further comprising a shielding layer arranged between the electroacoustic transducer and the array of sensing structures to electrically shield the array of sensing structures from the electroacoustic transducer.

15. The sensing device according to claim 14, wherein the shielding layer comprises an electrically conductive structure connected to ground potential.

16. The sensing device according to claim 1, wherein the electroacoustic transducer is arranged between the array of sensing structures and the protective top layer.

17. A method for controlling a capacitive fingerprint sensing device comprising:
- a protective dielectric top layer having an outer surface forming a sensing surface to be touched by a finger;
- a two-dimensional array of electrically conductive sensing structures arranged underneath said top layer;
- readout circuitry coupled to each of said electrically conductive sensing structures to receive a sensing signal, based on a capacitive coupling between the finger and a respective sensing structure, indicative of a distance between said finger and said sensing structure; and
- an electroacoustic transducer arranged underneath said top layer, the method comprising:
- activating the electroacoustic transducer, generating an acoustic wave, and transmitting the acoustic wave through the protective dielectric top layer towards the sensing surface to induce an ultrasonic vibration potential in a ridge of a finger placed in contact with the sensing surface; and
- capturing a main fingerprint image by reading out a capacitive coupling between the finger and the sensing structures by means of the readout circuitry.

18. The method according to claim 17, further comprising:
- before the step of activating the electroacoustic transducer, capturing an initial fingerprint image;
- comparing the initial fingerprint image with the main fingerprint image; and
- if the difference between the initial and the main fingerprint image is larger than a predetermined threshold, determining that the fingerprint image originates from an authentic finger.

19. The method according to claim 17, further comprising:
- before the step of activating the electroacoustic transducer, capturing an initial fingerprint image;
- comparing the initial fingerprint image with the main fingerprint image; and
- if the difference between the initial and the main fingerprint image is smaller than a predetermined threshold, determining that the fingerprint image originates from a fake finger.

20. A method for controlling a capacitive fingerprint sensing device comprising:
- a protective dielectric top layer having an outer surface forming a sensing surface to be touched by a finger;
- a two-dimensional array of electrically conductive sensing structures arranged underneath said top layer;
- readout circuitry coupled to each of said electrically conductive sensing structures to receive a sensing signal, based on a capacitive coupling between the finger and a respective sensing structure, indicative of a distance between said finger and said sensing structure; and
- an electroacoustic transducer arranged underneath said top layer, the method comprising:
- activating the electroacoustic transducer, generating an acoustic wave, and transmitting the acoustic wave through the protective dielectric top layer towards the sensing surface to induce an ultrasonic vibration potential in a ridge of a finger placed in contact with the sensing surface;
- deactivating the electroacoustic transducer; and
- while the ultrasonic vibration potential in the finger is detectable, capturing a fingerprint image by reading out a capacitive coupling between the finger and the sensing structures by means of the readout circuitry.

\* \* \* \* \*